(12) United States Patent
Pham et al.

(10) Patent No.: US 7,874,518 B2
(45) Date of Patent: Jan. 25, 2011

(54) AIRCRAFT STRUCTURE INCLUDING COMPOSITE BEAM AND COMPOSITE PANEL WITH METAL FOIL THEREBETWEEN

(75) Inventors: Doan D. Pham, Renton, WA (US); Michael A. Lee, Kent, WA (US)

(73) Assignee: The Boeing Company, Chicago, IL (US)

( * ) Notice: Subject to any disclaimer, the term of this patent is extended or adjusted under 35 U.S.C. 154(b) by 920 days.

(21) Appl. No.: 11/378,791

(22) Filed: Mar. 16, 2006

(65) Prior Publication Data
US 2006/0147704 A1 Jul. 6, 2006

Related U.S. Application Data

(62) Division of application No. 10/719,219, filed on Nov. 21, 2003, now Pat. No. 7,052,573.

(51) Int. Cl.
*B64C 1/12* (2006.01)
(52) U.S. Cl. .................................................. 244/132
(58) Field of Classification Search ................. 244/132, 244/131, 129.1, 119; 156/307.1, 307.7
See application file for complete search history.

(56) References Cited

U.S. PATENT DOCUMENTS

| 4,411,380 | A | * | 10/1983 | McWithey et al. | 228/181 |
|---|---|---|---|---|---|
| 4,786,343 | A | * | 11/1988 | Hertzberg | 156/93 |
| 4,966,802 | A | * | 10/1990 | Hertzberg | 428/119 |
| 5,508,496 | A | * | 4/1996 | Hansen et al. | 219/633 |
| 5,698,316 | A | * | 12/1997 | Kuras et al. | 428/344 |
| 5,793,024 | A | * | 8/1998 | Matsen et al. | 219/633 |
| 5,814,137 | A | | 9/1998 | Blohowiak et al. | |
| 5,849,110 | A | | 12/1998 | Blohowiak et al. | |
| 5,866,272 | A | * | 2/1999 | Westre et al. | 428/593 |
| 5,869,140 | A | | 2/1999 | Blohowiak et al. | |
| 5,869,141 | A | | 2/1999 | Blohowiak et al. | |
| 5,935,698 | A | * | 8/1999 | Pannell | 428/223 |
| 5,939,197 | A | | 8/1999 | Blohowiak et al. | |
| 5,951,808 | A | | 9/1999 | Lacour et al. | |
| 5,958,578 | A | | 9/1999 | Blohowiak et al. | |
| 6,037,060 | A | | 3/2000 | Blohowiak et al. | |
| 6,320,118 | B1 | * | 11/2001 | Pridham et al. | 174/2 |
| 6,436,507 | B1 | * | 8/2002 | Pannell | 428/102 |
| 6,527,894 | B1 | * | 3/2003 | Rocker et al. | 156/182 |
| 2003/0019567 | A1 | * | 1/2003 | Burpo et al. | 156/245 |
| 2003/0168555 | A1 | * | 9/2003 | Livi et al. | 244/132 |

FOREIGN PATENT DOCUMENTS

EP 1 134 070 A1 9/2001

OTHER PUBLICATIONS

Performance Composites, "Graphite Composite Material Design Guide," Jun. 5, 2003. Retrieved online on Oct. 23, 2008 at: http://web.archive.org/web/20030605060438/http://performancecomposites.com/design_guide2.html.*

* cited by examiner

*Primary Examiner*—Tien Dinh
*Assistant Examiner*—Richard R Green

(57) ABSTRACT

A method and article of manufacture of joining a stringer to a wing or tail panel and curing a wing or tail panel is disclosed. A sheet of titanium is placed between a cured stringer and an uncured wing or tail panel. The stringer, wing or tail panel and sheet are then placed within a vacuum bag, and gas is pumped out of the bag. The bag is then placed in an auto-clave to cure the wing or tail panel.

12 Claims, 4 Drawing Sheets

AIRCRAFT STRUCTURE INCLUDING COMPOSITE BEAM AND COMPOSITE PANEL WITH METAL FOIL THEREBETWEEN

CROSS REFERENCE TO RELATED APPLICATIONS

The present application is a divisional application of U.S. patent application Ser. No. 10/719,219, filed Nov. 21, 2003 now U.S. Pat. No. 7,052,573.

BACKGROUND OF THE INVENTION

The present invention generally relates to vacuum bag molding and, more particularly, to curing resins using the vacuum bag molding process.

Referring to FIGS. 1 and 2, one method of vacuum-bag molding may comprise placing an uncured object such as a wing panel 12 or tail panel into a substantially gas-impermeable container or bag 18 and removing air or a gas, from the gas-impermeable bag 18 with a pump (not shown). A breather material 20 and a release film 22 may be applied between the gas-impermeable bag 18 and the wing panel 12 to prevent the gas-impermeable bag 18 from adhering to the wing panel 12 while the wing panel is curing. The gas-impermeable bag 18 and wing panel 12 are then placed on a lay-up mandrel 32 and cure in an auto-clave. The auto-clave may apply pressure and heat to consolidate layers of the curing wing panel 12 so as to remove entrapped air and volatiles, and to cure the wing panel 12. The gas-impermeable bag 18 generally has a skin tight fit to the wing panel 12, and thus translates the auto-clave pressure to the wing panel 12 such that there are relatively no undesired undulations of the wing layers.

However, as best shown in FIG. 2, there may be a low-pressure volume 28 interacting with the surface 34 of the curing wing panel 12, where the pressure is lower than the ambient pressure produced by the auto-clave. This lower pressure volume 28 may cause an undulation 30 in a wing layer. A cause for the low pressure volume is the bridging 26 of the gas-impermeable bag 18 over the base 24 of the stringer 10 to the curing wing panel 12, such that the auto-clave pressure does not translate to the curing wing panel 12. This problem may occur, but is not limited to, where one or more curing objects have a geometry that causes bridging. Undulations in a layer of a composite object reduce the tensile strength of an object. Undulations also increase production time and costs, as specially prepared shims may be required to mate parts to the object with undulations; for example mating a rib to a wing panel.

Also, it may be desirable when two objects are joined, that each object be uncured. Curing an object within an auto-clave may be an expensive and time consuming process as the auto-clave is typically reheated and repressurized during each curing cycle. Joining and curing two uncured objects together would eliminate one auto-clave cycle by combing two separate cycles into one. However, each object may be composed of a different resin and if each object is uncured, the resins of each object may mix, causing undesired properties.

As can be seen, there is a need for applying a pressure to all surfaces of an object while it is curing. Also, there is a need for coupling two or more curing objects such that there is no mixing of dissimilar resins. Moreover, there is a need for producing a part that has a predictable geometry so that the part may be joined to other parts without shimming.

SUMMARY OF THE INVENTION

In one aspect of the present invention, a method of curing comprises providing a first object, providing a second object, placing a first side of a sheet adjacent to a malleable portion of the first object, placing a second side of the sheet adjacent to a non-malleable portion of the second object, placing the first object, second object and sheet into a container, and removing gas from the container where bridging occurs, where the bridging extends from the second object to the sheet.

In another aspect of the present invention, a method of curing comprises providing a first object having a malleable portion, providing a second object having a non-malleable portion, placing a first side of a sheet adjacent to the malleable portion of the first object, placing a second side of the sheet adjacent to the non-malleable portion of the second object, placing the first object, second object and sheet into a container, and removing gas from the container where bridging occurs, where the bridging extends from the second object to the first object.

In another aspect of the present invention, a method of curing an object comprises providing an object having a malleable portion, placing a first side of a sheet adjacent to the malleable portion of the object, coupling the sheet to the object, placing the object and the sheet into a container, and removing gas from the container where bridging occurs, where the sheet provides pressure to the malleable portion.

In another aspect of the present invention, a method of joining a stringer and a panel, and curing portions of the panel, comprises providing the stringer; providing the panel; placing a first side of a sheet adjacent to an uncured portion of the panel; placing a second side of the sheet adjacent to a cured portion of the stringer; placing the stringer, panel and sheet into a nylon bag; and removing gas from the nylon bag where bridging occurs.

In another aspect of the present invention, an article of manufacture comprises a first composite object having a resin portion and a fiber portion, a second composite object having a resin portion and a fiber portion coupled to the first object, and a sheet disposed between the first composite object and the second composite object, where the sheet lies adjacent to the resin portion of the first composite object and the resin portion of the second composite object.

In another aspect of the present invention, an airplane wing comprises a stringer having a resin portion, a wing panel having a resin portion and coupled to the stringer, and a sheet disposed between the stringer and the wing panel, where the sheet lies adjacent to the resin portion of the stringer and the resin portion of the wing panel.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a method for curing a resin on a composite object such that low pressure areas caused by bridging of a gas-impermeable container or bag over the object, do not cause undulations in a layer of the curing resin. Such method may be used, for example, in an auto-clave. The present invention also provides an article of manufacture that is produced by the described method. The method may be used to produce articles such as airplane wings or tails.

Figure 3:
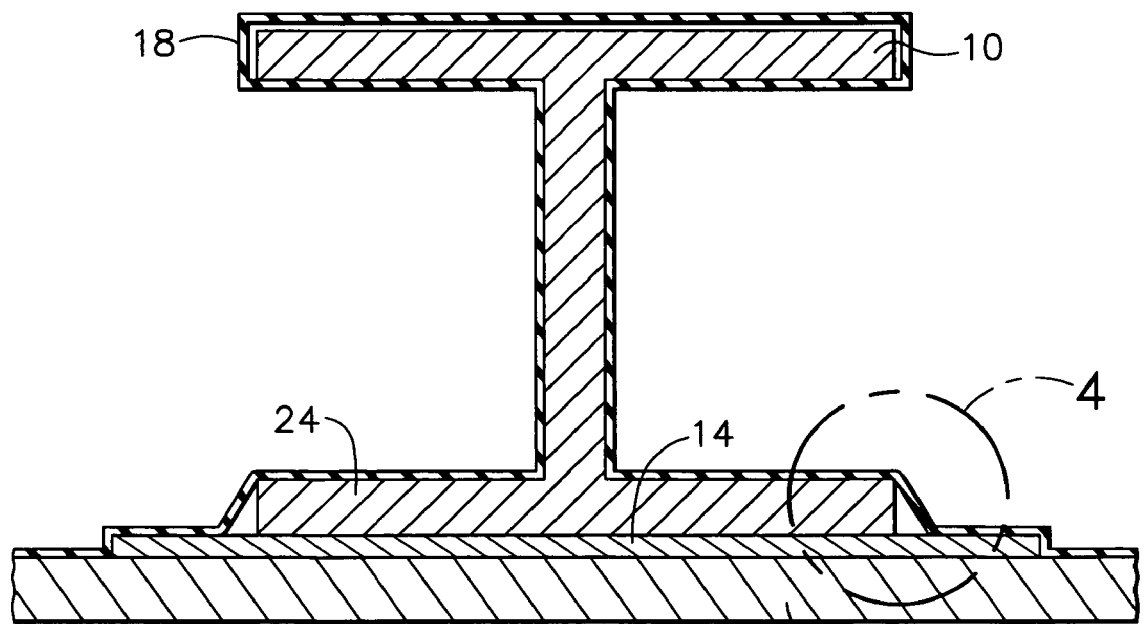
FIG. 3 is cross-sectional view from the side of a stringer, wing panel and vacuum bag according to one embodiment of the present invention.
Figure 4:
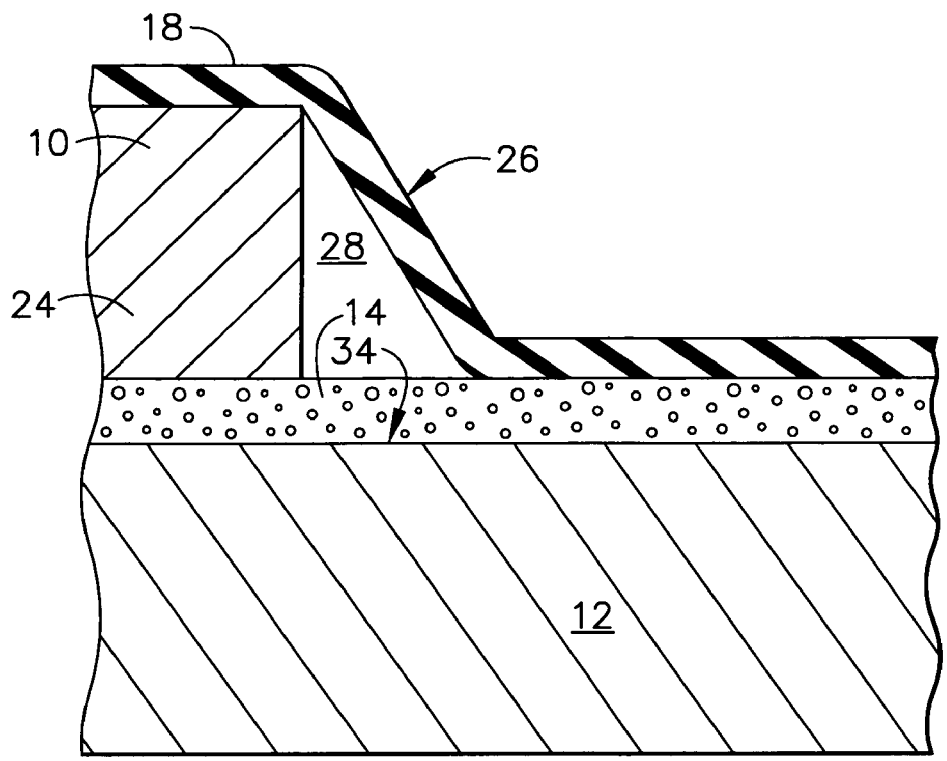
FIG. 4 is a fragmentary view taken along line 4 of the stringer, wing panel and vacuum bag in FIG. 3, according to one embodiment of the present invention.

Referring to FIGS. 3 and 4, in an embodiment, a substantially unmalleable object such as a cured composite stringer 10, is joined with a malleable object such as an uncured composite object. The uncured composite object may be a wing panel 12. Each composite object may be composed of resin and fiber. A sheet 14, such as titanium foil, is placed on a portion of the panel 12 where the stringer 10 is joined with the uncured wing panel 12. The sheet 14 may also comprise a metallic material, a non-metallic material and a material having a low coefficient thermal expansion, such as, but not limited to, less than $13.7 \times 10^{-6}$ inches/inches degrees Fahrenheit (in/in*F). The thickness of the sheet 14 may be, but not limited to, 0.005 to 0.010 inches. The cured composite stringer 10 is then coupled to the sheet 14 using an adhesive film such as Sol-gel. Sol-gel is described in U.S. Pat. Nos. 5,814,137, 5,849,110, 5,869,140, 5,869,141, 5,939,197, 5,958,578, and 6,037,060, and each patent is herein incorporated by reference. The Sol-gel may be first applied to the sheet 14 by immersing, spraying, or drenching the sheet 14 with the Sol-gel. The sheet 14 may then be coupled to the stringer 10 before the Sol-gel has dried. The sheet 14 is then coupled to the uncured wing panel. The sheet 14 may extend from the base of the stringer 10 by, but is not limited to, between 0.25 inch and 0.50 inch.

The coupled cured composite stringer 10, the sheet 14 and uncured wing panel 12 are then placed within a gas-impermeable container or bag 18, the air or gas within the gas-impermeable bag 18 is pumped out, and the gas-impermeable bag 18 sealed. The gas-impermeable bag 18 may be constructed of nylon. The pressure within the gas-impermeable bag 18 may at a pressure typically below ambient atmospheric pressure such as for example, but not limited to, between 25 inches of mercury to 29 inches of mercury.

The gas-impermeable bag 18 and its contents are then placed within an auto-clave. The pressure within the auto-clave may be elevated above ambient atmospheric pressure, for example, but not limited to, between 45 and 150 pounds per square inch. The temperature within the auto-clave may be raised above ambient temperature, for example, but not limited to, between 250 to 450 degrees Fahrenheit. The pressure differential between the inside of the gas-impermeable bag 18 and the pressure within the auto-clave causes the gas-impermeable bag 18 to have a skin tight fit over the cured composite stringer 10, the sheet 14 and the curing wing panel 12. There is bridging 26 of the gas-impermeable bag 18 from the base 24 of the stringer to the sheet 14, where gas-impermeable bag 18 does not transfer auto-clave pressure to either the sheet 14 or the curing wing panel 12.

Figure 1:
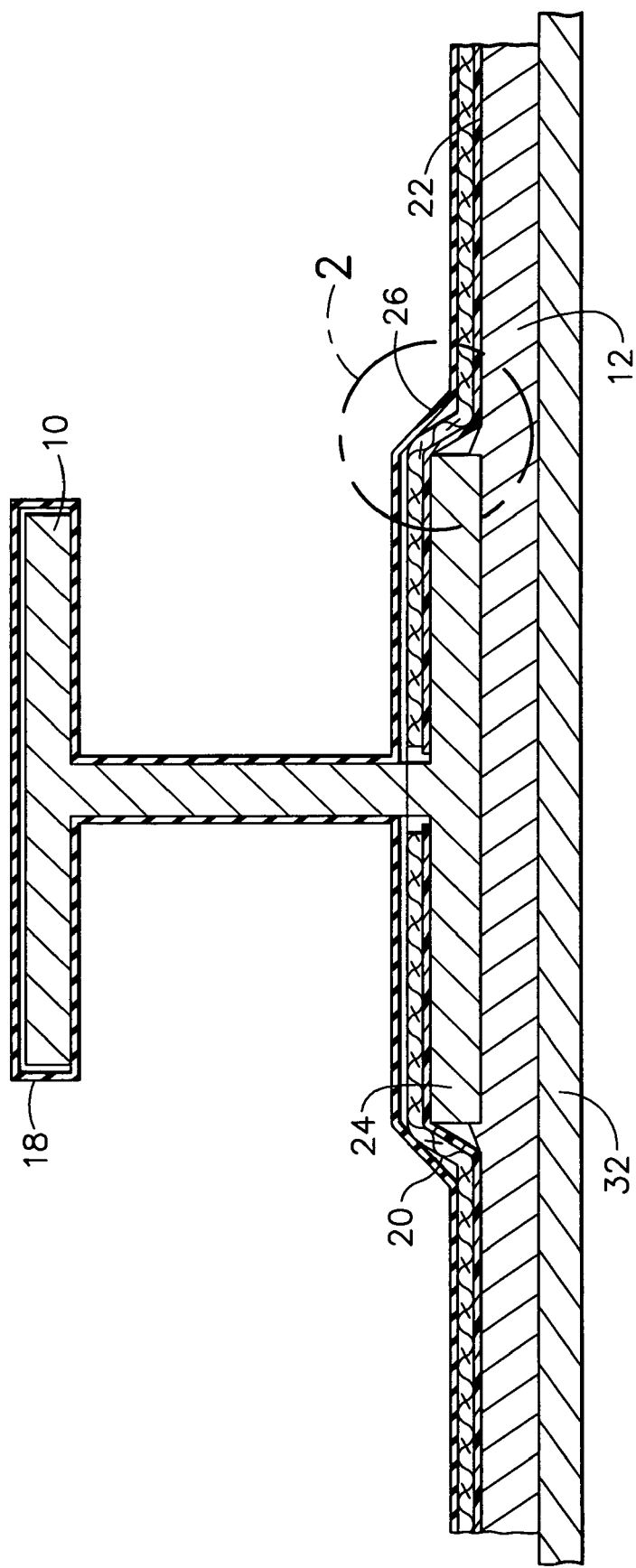
FIG. 1 is a cross-sectional view from the side of a stringer and wing panel within a vacuum bag.
Figure 2:
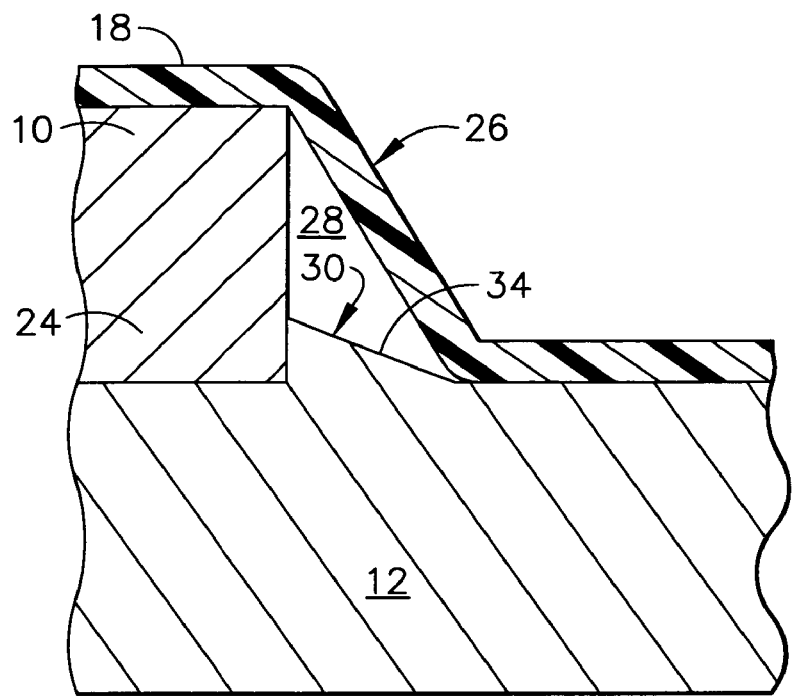
FIG. 2 is a fragmentary view taken along line 2 of the stringer, wing panel and vacuum bag in FIG. 1.

The gas-impermeable bag 18 is in contact with the sheet 14 such that the gas-impermeable bag 18 applies a force on the sheet 14 towards the curing wing panel 12. The sheet 14 extends from the stringer base 24 to the gas-impermeable bag 18 along the surface 34 of the wing panel. The pressure differential between the auto-clave pressure and the pressure within the gas-impermeable bag 18 causes the gas-impermeable bag 18 to exert force on the sheet 14 towards the curing wing panel 12. The sheet 14 resists bending by the low-pressure volume 28 contained within the bridging, such that the sheet 14 applies pressure on the curing wing panel 12. Thus, the sheet 14 prevents undulations—such as the undulation 30 shown in FIG. 2—from occurring in the curing wing panel 12.

Figure 5:
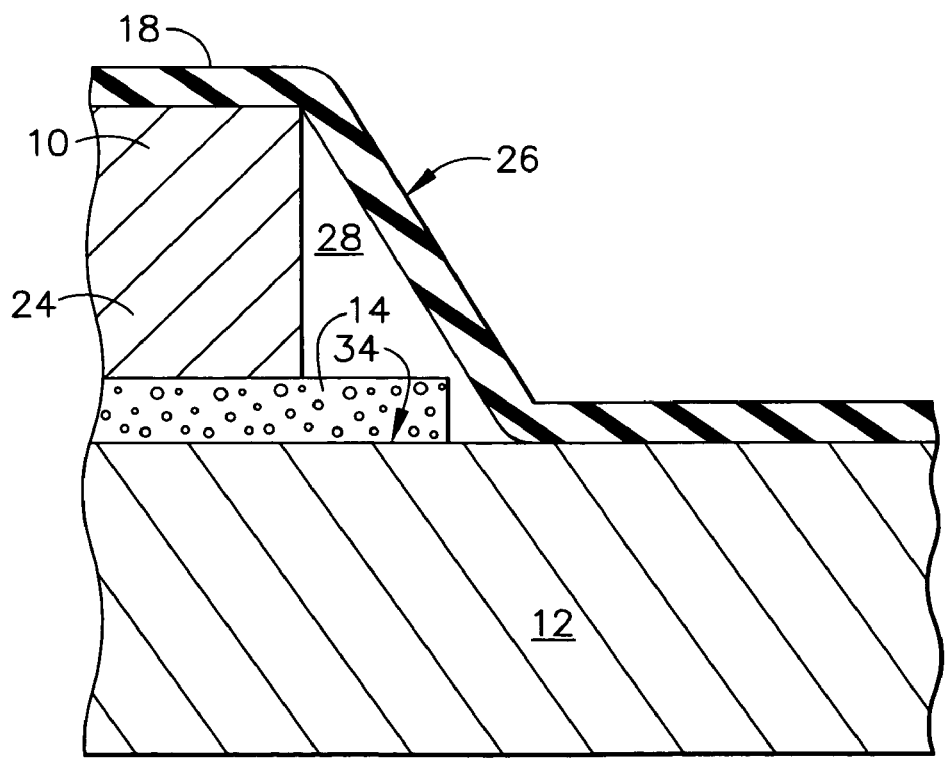
FIG. 5 is a fragmentary view of a stringer, wing panel and vacuum bag according to an embodiment of the present invention.

Referring to FIG. 5, in another embodiment, the gas-impermeable bag 18 does not contact the sheet 14 during the curing process, such that the gas-impermeable bag 18 does not apply a force on the sheet 14 towards the curing wing panel 12. The thickness of the sheet 14 is sufficient to resist bending by the low-pressure volume 28 contained within the bridging 26, such that the sheet 14 applies pressure on the wing panel 12 as the wing panel 12 cures.

In another embodiment, similar to that shown in FIGS. 3 through 5, an uncured stringer 10 is coupled, for example, using adhesive Sol-gel, to an uncured wing panel 12. The Sol-gel may be first applied to the sheet 14 by immersing, spraying, or drenching the sheet 14 with the Sol-gel. The sheet 14 may then be placed between the uncured stringer 10 and uncured wing panel 12 as the sheet 14 and uncured stringer 10 are coupled. The sheet 14 prevents the mixing of the resins of the uncured stringer 10 and the uncured wing panel 12. The uncured stringer 10, sheet 14 and uncured wing panel 12 are then placed within a gas-impermeable bag 18, and the gas-impermeable bag 18 is placed within an auto-clave to cure the stringer 10 and wing panel 12.

In another embodiment, similar to that shown in FIGS. 3 through 5, pre-preg material such as a partially cured stringer 10 is coupled to an uncured wing panel 12. A sheet 14 is placed between the partially cured stringer 10 and uncured wing panel 14. The partial curing reduces the possibility of the mixing of the resins of the stringer 10 and the wing panel 12. The partially cured stringer 10, sheet 14 and uncured wing panel 12 are then placed within a gas-impermeable bag 18, and the gas-impermeable bag 18 is placed within an auto-clave to cure the stringer 10 and wing panel 12.

In another embodiment, similar to that shown in FIGS. 3 through 5, a non-composite material such as a titanium stringer 10 is coupled to an uncured wing panel 12. A sheet 14 is placed between the titanium stringer 10 and uncured wing panel 12. The titanium stringer 10, sheet 14 and uncured wing panel 12 are then placed within a gas-impermeable bag 18, and the gas-impermeable bag 18 is placed within an auto-clave. The sheet 14 applies pressure to the uncured wing panel 12 and prevents undulations from forming during curing.

Figure 6:
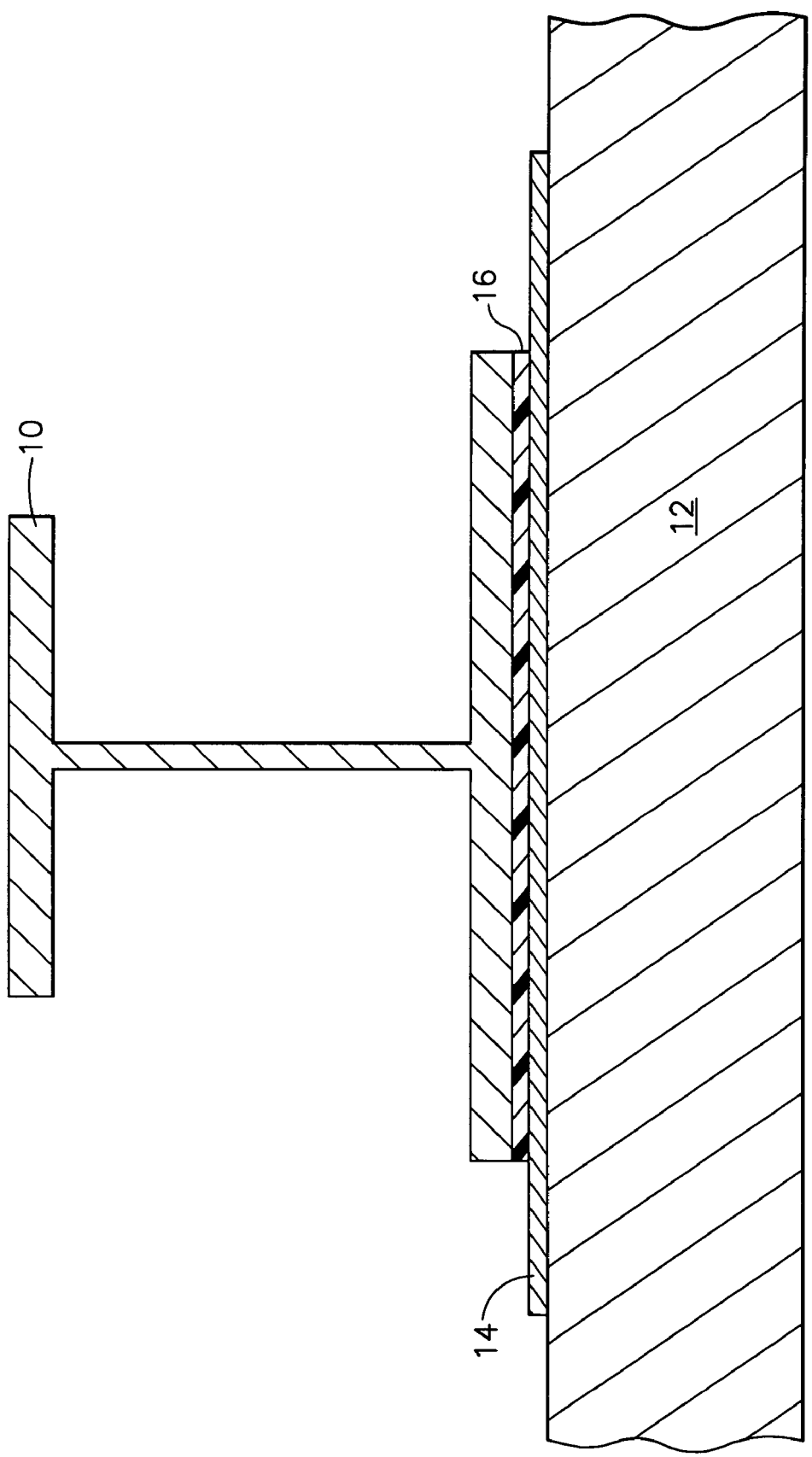
FIG. 6 is a cross-sectional side view of a stringer and wing panel, according to one embodiment of the present invention.

FIG. 6 illustrates one embodiment of a finished article, produced by, for example, the method illustrated in FIGS. 3 and 4, where a cured stringer 10 is coupled to a sheet 14 using a film of Sol-gel 16 and the sheet 14 is connected to a cured wing panel 12. The coupled stringer 10 and wing panel 14 may then be used, along with other wing elements such as rib chords, to form a wing.

It should be understood, of course, that the foregoing relates to preferred embodiments of the invention and that modifications may be made without departing from the spirit and scope of the invention as set forth in the following claims.

We claim:

1. An article of manufacture comprising:
   a composite beam including a plurality of plies of reinforcing fibers in a matrix;
   a composite aircraft skin panel including a plurality of plies of reinforcing fibers in a matrix; and
   a metal foil disposed between said composite beam and said composite aircraft skin panel, where said metal foil lies adjacent to said composite beam and said composite aircraft skin panel;
   wherein the beam, the skin panel, and the metal foil are a co-cured structure; and wherein the foil extends 0.25 to 0.5 inches beyond a base of the beam and prevents resin from flowing substantially therethrough.

2. The article of manufacture of claim 1 where said metal foil has a coefficient of thermal expansion less than $13.7 \times 10^{-6}$ inch/inch degree Fahrenheit.

3. The article of manufacture of claim 1 where said metal foil has a thickness between 0.005 inches and 0.010 inches.

4. An airplane wing comprising:
   a stringer having carbon fibers and a resin portion;
   a wing panel having carbon fibers and a resin portion; and
   titanium foil disposed between said stringer and said wing panel,
   the foil adjacent to said resin portion of said stringer and said resin portion of said wing panel, the foil extending one-quarter to one-half inch beyond a base of the stringer, the foil preventing resin from flowing substantially therethrough.

5. The airplane wing of claim 4 wherein the wing panel and the stringer are a co-cured structure.

6. The airplane wing of claim 4 where said foil has a thickness between 0.005 inches and 0.010 inches.

7. The airplane wino of claim 4 wherein the wing panel and the stringer are co-bonded.

8. The airplane wing of claim 4, wherein the metal foil does not have Z-pins.

9. An aircraft structure comprising:
   an uncured composite wing panel;
   a composite beam on the metal foil;
   a vacuum bag around the beam and the wing panel, where an abrupt transition from the composite beam to the wing panel is bridged by the vacuum bag; and
   a metal foil between the beam and the wing panel, the metal foil extending into a volume where bridging occurs and resisting bending during subsequent curing of the wing panel to prevent undulations in the wing panel, the foil extending one-quarter to one-half inch beyond a base of the stringer, the foil preventing resin from flowing substantially therethrough.

10. The aircraft structure of claim 9, wherein the composite beam is also uncured; and wherein the metal foil prevents mixing of resin from the uncured wing panel with resin from the uncured composite beam.

11. The aircraft structure of claim 9, wherein the composite beam is at least partially cured.

12. The aircraft structure of claim 9, wherein the composite beam is a stringer.

* * * * *